(12) United States Patent
Heck et al.

US007714057B2

(10) Patent No.: US 7,714,057 B2
(45) Date of Patent: May 11, 2010

(54) AUTOMOTIVE ARTICLES PREPARED FROM FILLED TPO COMPOSITIONS, AND METHODS OF MAKING THE SAME

(75) Inventors: Henry G. Heck, Lake Jackson, TX (US); Srimannarayana Kakarala, Bloomfield Hills, MI (US)

(73) Assignees: Dow Global Technologies Inc., Midland, MI (US); Inteva Products, LLC, Troy, MI (US)

( * ) Notice: Subject to any disclaimer, the term of this patent is extended or adjusted under 35 U.S.C. 154(b) by 563 days.

(21) Appl. No.: 11/473,706

(22) Filed: Jun. 23, 2006

(65) Prior Publication Data

US 2007/0037914 A1    Feb. 15, 2007

Related U.S. Application Data

(60) Provisional application No. 60/694,150, filed on Jun. 24, 2005.

(51) Int. Cl.
*C08J 3/22*    (2006.01)
*C08L 23/00*    (2006.01)

(52) U.S. Cl. ..................................... 524/451; 525/240

(58) Field of Classification Search ................. 524/451; 525/240
See application file for complete search history.

(56) References Cited

U.S. PATENT DOCUMENTS

| | | | |
|---|---|---|---|
| 5,286,776 A | | 2/1994 | Ichikawa et al. |
| 6,300,419 B1 * | | 10/2001 | Sehanobish et al. ......... 525/191 |
| 6,403,692 B1 | | 6/2002 | Traugott et al. |
| 6,498,214 B2 | | 12/2002 | Laughner et al. |
| 6,506,842 B1 | | 1/2003 | Heck et al. |
| 6,548,600 B2 | | 4/2003 | Walton |
| 6,660,797 B1 | | 12/2003 | Banno et al. |
| 6,667,359 B1 | | 12/2003 | Nakagawa et al. |
| 6,680,361 B1 | | 1/2004 | Cady et al. |
| 6,737,131 B1 | | 5/2004 | Garcia |
| 6,759,475 B2 | | 7/2004 | Sakai et al. |
| 6,815,490 B2 | | 11/2004 | Seelert et al. |
| 7,338,994 B2 | | 3/2008 | Walton et al. |
| 2003/0176580 A1 | | 9/2003 | Seelert et al. |
| 2004/0044107 A1 | | 3/2004 | Kikuchi et al. |
| 2004/0094986 A1 | | 5/2004 | Landvik et al. |
| 2004/0122196 A1 | | 6/2004 | Pierini et al. |
| 2004/0188885 A1 | | 9/2004 | Lorenzo et al. |
| 2005/0029692 A1 | | 2/2005 | Abe et al. |
| 2005/0140049 A1 | | 6/2005 | James et al. |
| 2005/0176892 A1 * | | 8/2005 | Weaver et al. ............... 525/194 |
| 2005/0209403 A1 | | 9/2005 | Walton et al. |
| 2005/0272858 A1 | | 12/2005 | Pierini et al. |
| 2007/0037913 A1 | | 2/2007 | Heck |
| 2007/0167575 A1 | | 7/2007 | Weaver et al. |
| 2008/0132595 A1 | | 6/2008 | Heck |

FOREIGN PATENT DOCUMENTS

| | | |
|---|---|---|
| EP | 0826728 | 6/2000 |
| EP | 1554337 | 7/2005 |
| WO | WO-96/19533 | 6/1996 |
| WO | WO-98/39385 A1 | 9/1998 |
| WO | WO-99/00451 | 1/1999 |
| WO | WO-02/12377 | 2/2002 |
| WO | WO-2004/033509 | 4/2004 |
| WO | WO-2005/023924 | 3/2005 |
| WO | WO-2006/026058 | 3/2006 |

OTHER PUBLICATIONS

DuPont Dow Elastomers Product Information, Feb. 2004.*
BP Amoco Accpro 9934 data sheet (no date available).*
Product data sheet of Dow Engage ENR 7380.*
Huneault, et al, Performance of Talc/Ethylene-Octene Copolymer/Polypropylene Blends, Polymer Engineering and Science, Jun. 1999, vol. 39, No. 6, pp. 1130-1138.
Laughner, et al., Modification of Polypropylene by Ethylene/α-Olefin Elastomers Produced by Single Site Constrained Geometry Catalyst, paper given in Troy, MI at the Global Automotive TPO Conference sponsored by SPE in Sep. 1999.

* cited by examiner

*Primary Examiner*—Ling-Siu Choi
*Assistant Examiner*—Hui Chin

(57) ABSTRACT

An automotive part containing at least one component formed from a composition comprising the following: (i) a crystalline, isotactic propylene homopolymer, (ii) an ethylene/α-olefin elastomeric impact modifier, and (iii) a reinforcing grade of filler, for example, talc. The crystalline isotactic propylene homopolymer has a flex modulus of greater than about 1930 MPa and a heat deflection temperature (HDT) of greater than about 100° C.; the ethylene/α-olefin interpolymer has a Tg of less than about −30° C., and a tan delta measured at 0.1 radians/s at 190° C. of less than about 2; and the filler has a HDT reinforcing efficiency of at least about 2. The automotive part has an HDT of greater than about 100° C. and a flex modulus of greater than about 1930 MPa.

25 Claims, No Drawings

US 7,714,057 B2

AUTOMOTIVE ARTICLES PREPARED FROM FILLED TPO COMPOSITIONS, AND METHODS OF MAKING THE SAME

REFERENCE TO PRIOR APPLICATION

This application claims the benefit of Provisional Application No. 60/694,150, filed on Jun. 24, 2005, incorporated herein, in its entirety, by reference.

FIELD OF THE INVENTION

The present invention relates to automotive parts, such as an instrument panel assembly, and methods of forming the same. In particular, the invention relates to automotive parts formed from filled thermoplastic polyolefins (TPO) compositions. In one aspect, this invention relates to TPO compositions comprising a highly crystalline isotactic propylene homopolymer, an ethylene/α-olefin (EAO) elastomeric impact modifier, and a reinforcing grade of a platy filler, for example, talc. In another aspect, this invention relates to such filled TPO compositions having low gloss, good low temperature impact resistance, and superior flex modulus and heat deflection temperature (HDT) properties. In yet another aspect, this invention relates to injection molded automotive articles prepared from these TPO compositions.

BACKGROUND OF THE INVENTION

In general, the automotive industry has sought to form automotive assemblies that have both structural integrity and relatively low weight. For example, an instrument panel assembly of an automotive vehicle must exhibit sufficient structural integrity for supporting one or more peripheral components, such as air bag assemblies, steering columns, or other panel parts, and at the same time, should maintain a low weight to assist in lowering the overall weight for the vehicle.

Talc-filled TPOs have gained widespread use in automotive exterior applications, such as fascia, and other applications, requiring a balance of rigidity, impact resistance, at temperatures down to about −30° C., resistance to scratching and marring, and resistance to deformation, at temperatures of about 100° C. The flex modulus for these grades of TPOs is typically between about 100,000 and 200,000 psi, and the HDT is typically below about 110° C.

New materials have been developed for soft TPOs that can be used as an instrument panel (IP) skin in automobiles. These materials are designed to be thermoformed after either extrusion or calendaring. Once formed, these skins exhibit the required low gloss, low temperature impact resistance, scratch and mar resistance, and grain retention.

The thermoformed IP skins described above are placed over a structure made from polycarbonate/acrylonitrile-butadiene-styrene (PC/ABS) copolymer and urethane foam is injected in between the skin and structure to create a "soft-touch" instrument panel. PC/ABS has been chosen, despite its cost, because of its greater rigidity (typically 330,000-350,000 psi flex modulus), and its greater resistance to deflection under load at elevated temperatures (typically 120° C.-130° C.). Because the structure must also remain undamaged when a passenger side airbag deploys, the structure must also be able to survive an airbag deployment at −20° C., preferably −30° C.

Of continuing interest to the automotive industry is to replace the PC/ABS structure with lower cost polyolefin alternatives. Several polypropylene compositions are described in the following patents or applications. U.S. Pat. No. 6,759,475 describes a resin composition based on crystalline polypropylene, which includes: (a) 3-65 percent, by weight, of a component soluble in paraxylene of 23° C., (b) 35-97 percent, by weight, of a component soluble in paraxylene of 135° C., and insoluble in paraxylene of 23° C., and (c) 0-30 percent, by weight, of a component insoluble in paraxylene of 135° C. (for example, see abstract). The component (a), soluble in paraxylene of 23° C., is composed substantially of an elastomeric constituent (a1) having a content of styrene, or its derivative, in the range of 0-35 percent, by weight, and an intrinsic viscosity (η) in the range of 0.1-5 dl/g. The component (b), soluble is paraxylene of 135° C., and insoluble in paraxylene of 23° C., is composed substantially of a crystalline polypropylene constituent (b1) having an isotactic pentad proportion (mmmm) of 97 percent or higher, a molecular weight distribution (Mw/Mn) of 6 or higher, and a molecular weight distribution (Mz/Mw) of 6 or higher. The component (c), insoluble in paraxylene of 135° C., is composed substantially of a filler (c1).

U.S. Patent Application No. 2004/0044107 describes a propylene resin composition that has good molding abilities and a good balance of physical properties as well as a good appearance, lower gloss and scratch resistance. These compositions can be used for interior car parts (for example, see abstract). The polypropylene resin composition comprises the following components; a crystalline homopolypropylene having MFR of 500 to 3,000 g/10 min; a polypropylene consisting of a crystalline homopolypropylene and an ethylene-propylene copolymer rubber having 45 to 80 percent, by mass, of a ethylene content; a polypropylene, consisting of a crystalline homopolypropylene and an ethylene-propylene copolymer rubber having 25 percent, by mass, or more, to below 45 percent, by mass, of a ethylene content; and an ethylene-α-olefin copolymer rubber (for example, see abstract).

U.S. Pat. No. 6,660,797 describes a propylene-based composition for molded polypropylene resin articles, excellent in resistance to scratching and moldability, and well-balanced properties between high rigidity and high impact strength, and also provides a method for molding the above propylene-based composition, to provide high-performance industrial parts and automobile parts, and in particular automobile interior parts (for example, see abstract). An example propylene-based resin composition contains the following components (A) and (B), as described below (for example, see column 2, lines 14-49). Component (A) is a propylene-based resin composed of the following components (a1), (a2) and (a3); 90 to 40 weight percent: (a1) propylene/ethylene block copolymer, composed of 60 to 83 weight percent of crystalline propylene homopolymer component (a1-1 unit) and 17 to 40 weight percent of ethylene/propylene random copolymer component (a1-2 unit), containing 30 to 52 weight percent of ethylene, and having a weight-average molecular weight of 230,000 to 600,000; and having a melt flow rate (230° C., 2.16 kg) of 15 to 150 g/10 min, and number of gels of 100, or less, for those having a size of 50 µm, or more, in the molded article of 25 cm² (area) and 0.5 mm (thickness); 100 weight parts; (a2) talc having an average particle size of 0.5 to 15 µm; 0 to 200 weight parts; (a3) ethylene/α-olefin copolymer rubber, containing 20 to 50 weight percent of α-olefin of 3 to 8 carbon atoms and having a melt flow rate (230° C., 2.16 kg) of 0.3 to 100 g/10 min; 0 to 20 weight parts. Component (B) is a propylene-based resin material, composed of the following components (b1) and (b2); 10 to 60 weight percent: (b1) propylene homopolymer or propylene/ethylene block copolymer, having a component insoluble in orthodichlorobenzene, at below 120° C., accounting for 8 weight percent or more of the component insoluble at below 100° C., when fractionated with orthodichlorobenzene as the solvent, and wherein the component insoluble, at below 100° C., has a weight-average molecular weight of 200,000 or more, and melt flow rate (230° C., 2.16 kg) of 0.3 to 70 g/10 min; 15 to 80 weight parts; and (b2) talc or wollastonite having an average particle size of 0.5 to 15 μm; 20 to 85 weight parts (for example, see column 2, lines 14-49).

Additional polypropylene compositions are described in U.S. Pat. No. 5,286,776 and U.S. Pat. No. 6,667,359. Other polyolefin compositions and fabricated articles, such as automotive parts, prepared from the same, are described in U.S. Publication Nos: 2005/0029692; 2004/0188885; and 2004/0094986. Additional propylene-based polymers and compositions are described in described in U.S. Publication No. 2005/0272858 (see also International Publication No. 2004033509), and U.S. Publication No. 2004/0122196. However, the compositions disclosed in these references, and those discussed above, are complex and costly due to the number of polymeric components in each composition and/or do not meet one or more desired rheological, mechanical or thermal properties of the inventive compositions described herein. Moreover, several of the compositions disclosed in these references require a polypropylene/(ethylene/polypropylene) heterophasic rubber, which is not advantageous for low temperature impact properties.

There is a continued need for low cost polyolefin compositions, simple in polymeric formulations, and which can be used to form manufactured parts, such as automotive parts, that have excellent mechanical and thermal properties. There is a further need for filled TPO compositions that can be used to form reinforced, light weight automotive parts, such as light-weight injection molded parts. There is also a need for such compositions that can be used to form automotive parts with improved high temperature and low temperature performance properties. These needs and others have been satisfied by the following invention.

SUMMARY OF THE INVENTION

The present invention provides for automotive parts, and more particularly, injection molded automotive parts, such as panel assemblies. Such parts are of relatively low weight, while maintaining high structural integrity.

According to this invention, automotive structures are made from TPO compositions, comprising crystalline isotactic propylene homopolymer, an EAO elastomeric (or ethylene/α-olefin) impact modifier, and a reinforcing grade of platy filler, offer a low cost alternative to conventional PC/ABS resins.

These TPO compositions are used to form parts having low gloss, good low temperature impact resistance to about −30° C., as measured by an Instrumented Dart Impact Test (ASTM D3763) and by Izod Notched Impact (ASTM D256), a flexural modulus greater than about 1930 MPa (ASTM D790, 1 percent secant modulus), and an HDT (ASTM D648, 0.455 MPa) greater than about 100° C.

Such compositions comprise the following: (a) a highly crystalline, isotactic propylene homopolymer, with a flexural modulus greater than about 1930 MPa (ASTM D790), and an HDT greater than about 100° C. (ASTM D648, 0.455 MPa), (b) an ethylene/α-olefin elastomeric impact modifier (or ethylene/α-olefin interpolymer), with a Tg less than −30° C., measured by Differential Scanning Calorimetry (DSC), a tan delta of less than about 2, measured at 190° C., and 0.1 radians per second frequency with an Advanced Rheometric Expansion Systems (ARES) rheometer, and an HDT measured by ASTM D648, at 0.455 MPa, that is greater than, or equal to, the peak melting temperature of the impact modifier measured by DSC, and (c) a platy filler. In such compositions, the ratio of homopolymer to impact modifier (A:B) is between about 9:1 and about 6:4.

Typically, the ARES rheometer is operated at 15 percent strain. The DSC procedure for measuring the glass transition temperature (Tg) includes an initial equilibrium of three minutes at 200° C., followed by a ramp down to −90° C., at 10° C./minute, followed by equilibrium for five minutes, and finally, followed by ramp up to 200° C. at 10° C./minute. The amount of platy filler in the TPO composition can vary widely, but typically, sufficient filler is used, such that the compositions of this invention have a flexural modulus efficiency factor of about 3 or more, and a heat deflection efficiency factor of about 1.5 or more. The factors are determined by the benchmarking methods described below. The ratio of filler (C) to composition (A+B+C), or (C:(A+B+C)), is adjusted, as needed, to achieve the desired compositional flexural modulus and HDT. The TPO compositions of this invention can comprise one or more other components, such as pigment and/or a scratch and mar resistant additive. The pigment is typically added as a color concentrate, and molded articles made from these compositions exhibit good color, such that they may not need painting.

Thus, the invention provides for an automotive part, comprising at least one component formed from a polyolefin composition having a heat deflection temperature (HDT) of greater than about 100° C. and flexural modulus of greater than about 1930 MPa, the composition comprising:

A) a crystalline isotactic propylene homopolymer having a flex modulus of greater than about 1930 MPa and an HDT of greater than about 100° C.;

B) an ethylene/α-olefin interpolymer having Tg of less than about −30° C., a tan delta measured at 0.1 radians/s at 190° C. of less than about 2, an HDT that is greater than, or equal to, the peak melting temperature of the ethylene/α-olefin interpolymer, measured by differential scanning calorimetry, and C) A platy filler, and wherein the weight ratio of homopolymer:interpolymer (A:B) is between about 9:1 and about 6:4.

In one aspect, the weight percent of filler, based on the sum weight of the propylene homopolymer, the ethylene/α-olefin interpolymer and filler, is greater than the weight percent of the ethylene/α-olefin interpolymer, based on the sum weight of the propylene homopolymer and the ethylene/α-olefin interpolymer.

In another aspect, the compositions further comprise at least one additive selected from a pigment, a flame retardant, a scratch and mar resistant additive, or combinations thereof.

In a further aspect of the invention, the automotive part is selected from the an instrument panel, a door panel, a dashboard, a body side molding, a trim molding, an armrest, a sun visor, a compartment case or an insulating mat.

In another aspect, the propylene homopolymer has a flex modulus of greater than 2070 MPa, and an HDT of greater than 110° C., and more preferably a flex modulus of greater than 2210 MPa, and an HDT of greater than 120° C.

In another aspect of the invention, the α-olefin of the ethylene/α-olefin interpolymer is a C3-C20 α-olefin, and more preferably a C4-C20 α-olefin. In a further aspect, the α-olefin of the ethylene/α-olefin interpolymer is selected from the propylene, 1-butene, 1-hexene or 1-octene, and more preferably is selected from 1-butene, 1-hexene or 1-octene. In another aspect of the invention, the ethylene/α-olefin interpolymer has a Tg of less than −30° C., preferably less than −40° C., and more preferably less than −50° C. In another aspect, the difference between the "HDT" and the "melting point, Tm," of the ethylene/α-olefin interpolymer is at least 4, preferably at least 6, and more preferably at least 8. In another aspect, the tan delta, measured at 190° C. and 0.10 radians/second, of the ethylene/α-olefin interpolymer is 2 or less, and more preferably 1.8 or less.

In another aspect of the invention, the filler is platy talc. In a further aspect, the composition comprises a sufficient amount of the filler, such that the composition has a flexural modulus efficiency factor of 3 or more, and an HDT efficiency factor of 1.5 or more. In another aspect, the composition comprises 20 weight percent, and more preferably 30 weight percent of talc based on the total weight of the composition. In another aspect, the composition comprises preferably greater than, or equal to, 30 weight percent, and more preferably greater than, or equal to, 35 weight percent talc, based on the total weight of the composition. In another aspect, the weight percent of filler, based on the "sum weight of the propylene homopolymer, the ethylene/α-olefin interpolymer and filler," is greater than the weight percent of the ethylene/α-olefin interpolymer, based on the "sum weight of the propylene homopolymer and the ethylene/α-olefin interpolymer." In a further aspect, the composition further comprises one or more other different ethylene/α-olefin interpolymers. In yet a further aspect, the weight percent of filler, based on the "sum weight of the propylene homopolymer, the ethylene/α-olefin interpolymer, the one or more other different ethylene/α-olefin interpolymers, and filler," is greater than the weight percent of the ethylene/α-olefin interpolymer and the one or more other different ethylene/α-olefin interpolymers, based on the "sum weight of the propylene homopolymer, the ethylene/α-olefin interpolymer and one or more different ethylene/α-olefin interpolymers."

22. In another aspect, the automotive part, or at least one component thereof, is formed by injection molding. In a further aspect, the injection molding is preformed using tooling designed for PC/ABS resins. In another aspect, the part is formed by injection molding, and wherein "out-of-tool" shrinkage of the part in the x-y direction is 10 percent or less of the amount of shrinkage of the part in the x-y direction inside the tool cavity.

In another aspect, the automotive part is an instrument panel. In yet another aspect, the automotive part is a door panel.

The invention also provides for methods of making the inventive automotive parts. In a further aspect, a method comprises injection molding a composition comprising a polypropylene homopolymer, an ethylene/α-olefin interpolymer and a platy filler.

The invention also provides for automotive parts comprising a combination of two or more aspects or embodiments as described herein. The invention also provides for methods of making such automotive parts, said methods comprising a combination of two or more aspects or embodiments as described herein.

DETAILED DESCRIPTION OF THE INVENTION

The present invention provides automotive parts, such as panel assemblies, from the compositions as described herein. The panel assemblies, such as an instrument panel or door panel, has at least one frame, and may also contain an adhesive, a weldment, a mechanical fastener, a combination thereof, or other forms of attachment for securing one or more additional component parts.

The panel assemblies may optionally contain, or be attached to, at least one reinforcement structure. The reinforcement structure is preferably configured for assisting in supporting one or more peripheral components, and/or may serve as a bridge for two or more portions of the frame, and/or may serve to increase the rigidity of the frame.

The main frame of a panel assembly may be configured in a variety of shapes and sizes, and may include decks, shelves, slots or other openings or support surfaces. The main frame is preferably configured to extend laterally across, partially, or substantially, an entire internal cabin area of a transportation vehicle. It is also preferable for the frame to include one or more openings (for example, cavities, through-holes or the like) for accommodating peripheral components, such as air bags, audio equipment, gauges, navigation systems, climate control component, power supplies, sensors, storage receptacles or other peripheral components. The frame may be suitably configured to receive the components, and secure them in place with a slotted joint, a snap fit, a quick connector, or some other mechanical attachment, with, or without, the use of an intermediate bracket, seal or other structure for absorbing energy.

The automotive parts are formed from the thermoplastic compositions, as described herein. Polypropylene is the primary polymeric component of such compositions, and it ultimately determines the maximum flexural modulus and HDT that can be achieved. Conventional propylene homopolymer has a flexural modulus (1% secant) of less than about 1520 MPa (220.4 kpsi), and an HDT of less than 90° C., and it is neither sufficiently stiff, nor does it retain its stiffness to a high enough temperature, to be useful in these compositions. To achieve the combined targets of low gloss, low temperature impact resistance, improved flexural modulus (e.g., greater than about 1520 Mpa, 1% secant), and improved HDT (e.g., greater than about 90° C.), preferably the polypropylene is a highly crystalline, isotactic homopolymer with a flexural modulus greater the about 1930 MPa (280 kpsi), and an HDT greater than about 100° C. More preferred grades of highly crystalline, isotactic homopolymer have a flexural modulus greater than about 2070 MPa (300 kpsi), and an HDT greater than about 110° C. The most preferred grades of highly crystalline, isotactic homopolymer polypropylene have a flexural modulus greater than about 2210 MPa (320 kpsi) and an HDT greater than about 120° C. In one embodiment, the propylene homopolymer has a HDT greater than about 90° C., preferably greater than about 100° C., more preferably greater than about 110° C., even more preferably greater than about 120° C., and most preferably greater than about 130° C. In another embodiment, the propylene homopolymer has a flexural modulus greater than about 1720 MPa (250 kpsi), preferably greater than about 1930 MPa (280 kpsi), more preferably greater than about 2210 MPa (320 kpsi), and most preferably greater than about 2210 MPa (320 kpsi).

The superior resistance to low temperature impact is contributed by modification of the highly crystalline, isotactic homopolymer polypropylene with an EAO elastomeric impact modifier (or ethylene/α-olefin). To provide the needed impact resistance at −30° C., the EAO elastomeric impact modifier has a glass transition temperature (Tg) of less than −30° C., more preferably less than −40° C., and most preferably less than −50° C.

In addition, two other characteristics of the elastomeric impact modifier affect the properties of the composition. First, because the EAO elastomeric impact modifier will be above its melting point well before the highly crystalline, isotactic propylene homopolymer begins to melt, it is desirable to select a grade with an HDT significantly greater than its melting point. Table 1 below shows the delta obtained by subtracting the DSC peak melting temperature (Tm) from the HDT measured on various EAO elastomers. Preferred grades of EAO elastomeric impact modifiers have a positive delta, more preferred grades have a delta of 4 or more, even more preferred grades have a delta of 6 or more, and the most preferred grades have a delta of 8 or more.

TABLE 1

Tg and Delta (HDT − Tm) Parameters of Select Impact Modifiers

| EAO Elastomer | Target MI, dg/min | Density, g/cc | Tg, °C. | Tm, °C. | Viscosity Poise @ 190° C. and 0.1 rad/s | Tan Delta @ 190° C. and 0.1 rad/s | HDT, °C. | Delta, (HDT − Tm) |
|---|---|---|---|---|---|---|---|---|
| Engage ™ 8003 | 1.0 | 0.885 | −46 | 76.50 | 99340 | 6.53 | 53.60 | −22.90 |
| Engage ™ 8150 | 0.5 | 0.868 | −52 | 54.99 | 234600 | 3.28 | Fail | |
| ENR 7467 | 1.2 | 0.862 | −56 | 35.39 | 59059 | 16.29 | Fail | |
| ENR 7447 | 5.0 | 0.865 | −53 | 34.74 | 17166 | 106.91 | 49.00 | 14.26 |
| Engage ™ 8200 | 5.0 | 0.87 | −53 | 59.05 | 18312 | 50.16 | Fail | |
| ENR 7270 | 0.8 | 0.88 | −44 | 63.56 | 140960 | 4.76 | 63.00 | −0.56 |
| Engage ™ 8100 | 1.0 | 0.87 | −52 | 59.84 | 107900 | 6.61 | 66.20 | 6.36 |
| Engage ™ 8842 | 1.0 | 0.857 | −58 | 38.41 | 111620 | 4.94 | 48.70 | 10.29 |
| ENR 7380 | 0.3 | 0.87 | −52 | 50.30 | 582470 | 1.58 | 60.55 | 10.25 |
| ENR 7086.01 | 0.3 | 0.901 | −33 | 95.20 | 542900 | 1.32 | 39.63 | −55.57 |

The Engage™ elastomers are ethylene-octene copolymers, and the ENR elastomers are ethylene-butene copolymers. The Dow Chemical Company manufactures both EAO elastomers.

Second, the tan delta of the elastomer, measured at 0.1 radian per second (rad/sec) at 190° C., correlates with the gloss of the finished injection molded part. The lower the tan delta, the lower the gloss. The tan delta and the viscosity in Poise, measured at these conditions, are shown in Table 1 above. The correlation between the tan delta and the 20 degree gloss (Minolta gloss meter, ASTM D523), measured on impact modified benchmarking formulations, utilizing a number of different EAOs, is shown in Table 2 below. The data in this table is based on compounds containing a polymer blend of 70 parts by weight of J707PT (a 35 MFR Mitsui Chemicals impact copolymer polypropylene with 30 parts by weight of various EAOs available from The Dow Chemical Company). The polymer blend is tested without filler and with the addition of 10 percent, by weight, Specialty Minerals ABT-2500 platy talc. Neither the impact copolymer nor the talc meet the criteria of this invention, but they serve to demonstrate how an EAO with a low tan delta at 190° C. and 0.1 radians/second can dramatically reduce the 20 degree gloss of an otherwise glossy system. This data shows that the choice of elastomer has the greatest effect on lowering the gloss of the polypropylene through the addition of filler (here talc). The polypropylene can vary widely, including both homopolymer and copolymer and both nucleated and non-nucleated polymers. High MFR polypropylene is typically very glossy, and EAO addition has some effect of lowering the gloss to a flat finish.

TABLE 2

Effect of EAO with Low Tan Delta at 190° C. and 0.1 rad/s on the 20 Degree Gloss

| EAO Elastomer | Tan Delta @190° C. and 0.1 rad/s | 20 Degree Gloss (70 percent Polypropylene, 30 percent EAO) | 20 Degree Gloss (63 percent Polypropylene, 27 percent EAO, percent ABT 2500) |
|---|---|---|---|
| Engage ™ 8003 | 6.53 | 19.4 | 20.3 |
| Engage ™ 8150 | 3.28 | 14.5 | 12.4 |
| Engage ™ 7467 | 16.29 | 28.6 | 23.1 |
| ENR 7447 | 106.91 | 72.7 | 45.7 |
| Engage ™ 8200 | 50.16 | 70.6 | 47.5 |
| ENR 7270 | 4.76 | 16.3 | 17.6 |
| Engage ™ 8100 | 6.61 | 32.2 | 27.2 |
| Engage ™ 8842 | 4.94 | 37.5 | 31.5 |
| ENR 7380 | 1.58 | 8.8 | 4.1 |

The preferred grades of EAO elastomeric impact modifiers have Tg and delta properties as described above, and also have a tan delta measured at 190° C. and 0.1 radians/second of about 2 or less, more preferably of about 1.8 or less and most preferably of about 1.6 or less.

The low gloss obtained by the use of an EAO elastomeric impact modifier with the tan delta described above makes it possible to provide a part that is colored during the molding process through the use of a color concentrate. This mold-in-color process saves a painting step when the compound has an acceptably low gloss. Because paint is widely known to improve the resistance of the part to damage from scratching and marring, the color concentrate is frequently additionally modified with materials that decrease the surface friction and reduce the surface damage done by scratching and marring. Common additives known in the art are silicon based materials, such as high molecular weight polydimethyl siloxanes, waxy materials that bloom to the surface, such as erucamide, and some specialty materials that contain a combination of a hard tough plastic, such as nylon, with surface active agents.

Propylene Homopolymer

The propylene homopolymer may be a linear or a nucleated homopolymer, or a combination thereof.

The propylene homopolymer desirably has a melt flow rate (MFR) (230° C./2.16 kg weight) from 0.1 to 150, preferably from 1 to 100 g/10 min, more preferably from 3 to 75 g/10 min, even more preferably from 5 to 50 g/10 min. All individual values and subranges from 0.1 to 150 g/10 min are included herein and disclosed herein.

This polypropylene homopolymer also desirably has a melting point greater than 145° C. In another embodiment, the propylene component has a melting point, Tm, from 130° C. to 180° C., preferably from 140° C. to 170° C.

In another embodiment, the polypropylene homopolymer has a crystallization temperature, Tc, greater than, or equal to, 110° C., preferably greater than, or equal to, 120° C., and more preferably greater than, or equal to, 130° C., and most preferably greater than, or equal to, 140° C.

As here used, "nucleated" refers to a polymer that has been modified by addition of a nucleating agent such as Millad®, a dibenzyl sorbitol commercially available from Milliken. Other conventional nucleating agents may also be used. It is noted that the platy filler, such a talc, may act as a nucleator, and may make the addition of another nucleating agent unnecessary.

Polymerization processes, used to produce high melting polymers, include the slurry process, which is run at about 50-90° C. and 0.5-1.5 MPa (5-15 atm), and both the gas-phase and liquid-monomer processes in which extra care must be given to the removal of amorphous polymer. The polypropylene may also be prepared by using any of a variety of single site, metallocene and constrained geometry catalysts together with their associated processes. Polymerizations may take place in a stirred tank reactor, a gas phase reactor, a single continuously stirred tank reactor and a single slurry loop reactor, and other suitable reactors.

In a preferred embodiment, the polypropylene homopolymer is prepared in a single, continuous bulk phase (condensed propylene) stirred reactor, using a Ziegler-Natta catalyst, which includes a titanium catalytic active metal species, supported on a magnesium chloride support, and suspended in a mineral oil. The suspended catalyst may be pumped directly into the reactor. Hydrogen may be used as a chain transfer agent to control molecular weight. Polymerizations may take place in a stirred tank reactor, a gas phase fluidized bed reactor, a single continuously stirred tank reactor and a single slurry loop reactor. Such polymerizations, and the resulting polypropylene homopolymers, are described in U.S. Publication No. 2005/0272858 (see also International Publication No. 2004033509), and U.S. Publication No. 2004/0122196. Each of these three applications is incorporated herein, in its entirety, by reference.

In one embodiment, the propylene homopolymer has a molecular weight distribution (Mw/Mn) from 2 to 6, more preferably from 2 to 5 and most preferably from 3 to 5. All individual values and subranges from 2 to 6 are included herein and disclosed herein. In another embodiment, the molecular weight distribution is less than, or equal to, 6, and more preferably less than, or equal to, 5.5, and more preferably less than, or equal to, 5.

In another embodiment, the propylene homopolymer has a density from 0.88 to 0.92 g/cc, and preferably from 0.89 to 0.91 g/cc. All individual values and subranges from 0.88 to 0.92 g/cc are included herein and disclosed herein.

In another embodiment, the propylene homopolymer has a number average molecular weight, (Mn) from 10,000 g/mole to 200,000 g/mole, more preferably from 15,000 g/mole to 150,000 g/mole, and most preferably from 30,000 g/mole to 100,000 g/mole. All individual values and subranges from 10,000 g/mole to 200,000 g/mole are included herein and disclosed herein.

In another embodiment, the propylene homopolymer has a weight average molecular weight, (Mw) from 80,000 g/mole to 400,000 g/mole, more preferably from 100,000 g/mole to 300,000 g/mole, and most preferably from 120,000 g/mole to 200,000 g/mole. All individual values and subranges from 80,000 g/mole to 400,000 g/mole are included herein and disclosed herein.

Ethylene/α-olefin Interpolymer

The compositions of the invention comprise at least one ethylene/α-olefin interpolymer, which optionally may contain a diene. "Interpolymer," as used herein, refers to a polymer having polymerized therein at least two monomers. It includes, for example, copolymers, terpolymers and tetrapolymers. It particularly includes a polymer prepared by polymerizing ethylene with at least one comonomer, typically an alpha olefin (α-olefin) of 3 to 20 carbon atoms (C3-C20), preferably 4 to 20 carbon atoms (C4-C20), more preferably 4 to 12 carbon atoms (C4-C12) and even more preferably 4 to 8 carbon atoms (C4-C8). The α-olefins include, but are not limited to, 1-butene, 1-pentene, 1-hexene, 4-methyl-1-pentene, 1-heptene, and 1-octene. Preferred α-olefins include 1-butene, 1-pentene, 1-hexene, 4-methyl-1-pentene, 1-heptene, and 1-octene. The α-olefin is desirably a C4-C8 α-olefin.

Interpolymers include ethylene/butene (EB) copolymers, ethylene/hexene-1 (EH), ethylene/octene (EO) copolymers, ethylene/alpha-olefin/diene modified (EAODM) interpolymers such as ethylene/propylene/diene modified (EPDM) interpolymers and ethylene/propylene/octene terpolymers. Preferred copolymers include EB, EH and EO copolymers.

Suitable diene monomers include conjugated and nonconjugated dienes. The nonconjugated diolefin can be a C6-C15 straight chain, branched chain or cyclic hydrocarbon diene. Illustrative nonconjugated dienes are straight chain acyclic dienes, such as 1,4-hexadiene and 1,5-heptadiene; branched chain acyclic dienes, such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene and mixed isomers of dihydromyrcene; single ring alicyclic dienes, such as 1,4-cyclohexadiene, 1,5-cyclooctadiene and 1,5-cyclododecadiene; multi-ring alicyclic fused and bridged ring dienes, such as tetrahydroindene, methyl tetrahydroindene; alkenyl, alkylidene, cycloalkenyl and cycloalkylidene norbornenes, such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene and 5-cyclohexylidene-2-norbornene. Preferred nonconjugated dienes include ENB, 1,4-hexadiene, 7-methyl-1,6-octadiene, and more preferably the diene is ENB. Suitable conjugated dienes include 1,3-pentadiene, 1,3-butadiene, 2-methyl-1,3-butadiene, 4-methyl-1,3-pentadiene, or 1,3-cyclopentadiene.

Although preferred interpolymers are substantially free of any diene monomer that typically induces LCB, one may include such a monomer, if costs are acceptable, and desirable interpolymer properties, such as processability, tensile strength and elongation, do not degrade to an unacceptable level. Such diene monomers include, but are not limited to, dicyclopentadiene, NBD, methyl norbornadiene, vinyl-norbornene, 1,6-octadiene, 1,7-octadiene, and 1,9-decadiene. When added, such monomers may be added in an amount within a range from greater than zero to 3 weight percent, more preferably from greater than zero to 2 weight percent, based on interpolymer weight.

The ethylene/α-olefin interpolymers of the invention may be branched and/or unbranched interpolymers. The presence or absence of branching in the ethylene/α-olefin interpolymers, and if branching is present, the amount of branching, can vary widely, and may depend on the desired processing conditions and the desired polymer properties.

The nature of the ethylene/α-olefin (EAO) branching is not critical to the practice of this invention, and as such, it can vary to convenience. Preferably, the branching is long chain branching (LCB). The ability to incorporate LCB into polymer backbones has been known and practiced for many years. In U.S. Pat. No. 3,821,143, a 1,4-hexadiene was used as a branching monomer to prepare ethylene/propylene/diene (EPDM) polymers having LCB. Such branching agents are sometimes referred to as H branching agents. U.S. Pat. Nos. 6,300,451 and 6,372,847 also use various H type branching agents to prepare polymers having LCB. In U.S. Pat. No. 5,278,272, it was discovered that constrained geometry catalysts (CGC) have the ability to incorporate vinyl terminated macromonomers into the polymer backbone to form LCB polymers. Such branching is referred to as T type branching. Each of these patents (U.S. Pat. Nos. 3,821,143; 6,300,451; 6,372,847 and 5,278,272) is incorporated, herein, in its entirety, by reference.

The '272 patent teaches such CGC are unique in their ability to incorporate large unsaturated molecules into a polymer backbone. The amount of LCB that can be incorporated by these CGC is typically from 0.01 LCB/1000 carbon atoms to 3 LCB/1000 carbon atoms (both backbone and branched carbon atoms).

Preferably, the type of LCB in the interpolymers used in the practice of this invention is T-type branching, as opposed to H-type branching. T-type branching is typically obtained by copolymerization of ethylene or other alpha olefins with chain end unsaturated macromonomers in the presence of a constrained geometry catalyst under the appropriate reactor conditions, such as those described in WO 00/26268 (U.S. equivalent, U.S. Pat. No. 6,680,361, incorporated herein in its entirety by reference). If extremely high levels of LCB are desired, H-type branching is the preferred method, since T-type branching has a practical upper limit to the degree of LCB. As discussed in WO 00/26268, as the level of T-type branching increases, the efficiency or throughput of the manufacturing process decreases significantly, until the point is reached where production becomes economically unavailable. The T-type LCB polymers can be produced by constrained geometry catalysts, without measurable gels, but with very high levels of T-type LCB. Because the macromonomer being incorporated into the growing polymer chain has only one reactive unsaturation site, the resulting polymer only contains side chains of varying lengths, and at different intervals along the polymer backbone.

H-type branching is typically obtained by copolymerization of ethylene or other alpha olefins with a diene having two double bonds reactive with a nonmetallocene type of catalyst in the polymerization process. As the name implies, the diene attaches one polymer molecule to another polymer molecule through a diene bridge; the resulting polymer molecule resembling an H that might be described as more of a crosslink than a long chain branch. H-type branching is typically used when extremely high levels of branching are desired. If too much diene is used, the polymer molecule can form so much branching or crosslinking that the polymer molecule is no longer soluble in the reaction solvent (in a solution process), and consequently falls out of solution, resulting in the formation of gel particles in the polymer. Additionally, use of H-type branching agents may deactivate metallocene catalysts, and reduce catalyst efficiency. Thus, when H-type branching agents are used, the catalysts used are typically not metallocene catalysts. The catalysts used to prepare the H-type branched polymers in U.S. Pat. No. 6,372,847 (incorporated herein in its entirety by reference) are vanadium type catalysts.

Suitable ethylene interpolymers include ENGAGE™, AFFINITY™, and NORDEL™ polymers available from The Dow Chemical Company, and VISTALON™ and EXACT™ polymers available from ExxonMobil Chemical Company, and TAFMER™ polymers available from Mitsui Chemical. Preferred ethylene interpolymers include ENGAGE™ and AFFINITY™ polymers available from The Dow Chemical Company, and VISTALON™ and EXACT™ polymers available from ExxonMobil Chemical Company, and TAFMER™ polymers available from Mitsui Chemical.

In another embodiment, the ethylene/α-olefin interpolymer has a molecular weight distribution (Mw/Mn) from 1 to 5, more preferably from 1.5 to 4 and most preferably from 2 to 3. All individual values and subranges from 1 to 5 are included herein and disclosed herein.

In another embodiment, the ethylene/α-olefin interpolymer has a density from 0.80 to 0.90 g/cc, preferably from 0.82 to 0.88 g/cc, and more preferably from 0.87 g/cc. All individual values and subranges from 0.80 to 0.90 g/cc are included herein and disclosed herein. In another embodiment, the ethylene/α-olefin interpolymer has a density less than, or equal to, 0.875 g/cc, preferably less than, or equal to, 0.86 g/cc, and more preferably less than, or equal to, 0.85 g/cc.

In another embodiment, the ethylene/α-olefin interpolymer has a melt index, 12 (190° C./2.16 kg) from 0.05 to 10 g/10 min, preferably from 0.1 to 5 g/10 min, and more preferably from 0.2 to 2 g/10 min, or 0.5 to 1 g/10 min. All individual values and subranges from 0.05 to 10 g/10 min are included herein and disclosed herein. In another embodiment, the elastomer component has a melt index, 12, of 1 g/10 min or less, preferably of 0.5 g/10 min or less, and more preferably of 0.3 g/10 min or less.

In another embodiment, the ethylene/α-olefin interpolymer has a number average molecular weight, (Mn) from 40,000 g/mole to 200,000 g/mole, more preferably from 50,000 g/mole to 150,000 g/mole, and most preferably from 60,000 g/mole to 100,000 g/mole. All individual values and subranges from 40,000 g/mole to 200,000 g/mole are included herein and disclosed herein.

In another embodiment, the ethylene/α-olefin interpolymer has a weight average molecular weight, (Mw) from 80,000 g/mole to 400,000 g/mole, more preferably from 100,000 g/mole to 300,000 g/mole, and most preferably from 120,000 g/mole to 200,000 g/mole. All individual values and subranges from 80,000 g/mole to 400,000 g/mole are included herein and disclosed herein.

In another embodiment, the ethylene/α-olefin interpolymer has a Tg less than −30° C., preferably less than −40° C., and more preferably less than −50° C.

In another embodiment, the ethylene/α-olefin interpolymer is a homogeneously branched linear or homogeneously branched substantially linear ethylene/α-olefin interpolymer. Processes for preparing homogeneous polymers are disclosed in U.S. Pat. No. 5,206,075; U.S. Pat. No. 5,241,031; and PCT International Application WO 93/03093; each of which is incorporated, herein, by reference in its entirety. Further details regarding the production of homogeneous ethylene α-olefin copolymers are disclosed in U.S. Pat. No. 5,206,075; U.S. Pat. No. 5,241,031; PCT International Publication Number WO 93/03093; PCT International Publication Number WO 90/03414; all four of which are herein incorporated, herein, in their entireties, by reference.

The terms "homogeneous" and "homogeneously-branched" are used in reference to an ethylene/α-olefin polymer (or interpolymer), in which the comonomer(s) is randomly distributed within a given polymer molecule, and substantially all of the polymer molecules have the same ethylene-to-comonomer(s) ratio. The homogeneously branched ethylene interpolymers include linear ethylene interpolymers, and substantially linear ethylene interpolymers.

Included amongst the homogeneously branched linear ethylene interpolymers are ethylene interpolymers, which lack long chain branching, but do have short chain branches, derived from the comonomer polymerized into the interpolymer, and which are homogeneously distributed, both within the same polymer chain, and between different polymer chains. That is, homogeneously branched linear ethylene interpolymers lack long chain branching, just as is the case for the linear low density polyethylene polymers or linear high density polyethylene polymers, made using uniform branching distribution polymerization processes, as described, for example, by Elston in U.S. Pat. No. 3,645,992. Commercial examples of homogeneously branched linear ethylene/α-olefin interpolymers include TAFMER™ polymers supplied by the Mitsui Chemical Company and EXACT™ polymers supplied by ExxonMobil Chemical Company.

Substantially linear ethylene interpolymers used in the present invention are described in U.S. Pat. Nos. 5,272,236 and 5,278,272; the entire contents of each are herein incorporated by reference. As discussed above, the substantially linear ethylene interpolymers are those in which the comonomer is randomly distributed within a given interpolymer molecule, and in which substantially all of the interpolymer molecules have the same ethylene/comonomer ratio within that interpolymer. Substantially linear ethylene interpolymers are prepared using a constrained geometry catalyst. Examples of constrained geometry catalysts, and such preparations, are described in U.S. Pat. Nos. 5,272,236 and 5,278,272.

In addition, the substantially linear ethylene interpolymers are homogeneously branched ethylene polymers having long chain branching. The long chain branches have about the same comonomer distribution as the polymer backbone, and can have about the same length as the length of the polymer backbone. As discussed above, "substantially linear," typically, is in reference to a polymer that is substituted, on average, with 0.01 long chain branches per 1000 total carbons (including both backbone and branch carbons) to 3 long chain branches per 1000 total carbons.

Commercial examples of substantially linear polymers include ENGAGE™ polymers (The Dow Chemical Company), and AFFINITY™ polymers (The Dow Chemical Company).

The substantially linear ethylene interpolymers form a unique class of homogeneously branched ethylene polymers. They differ substantially from the well-known class of conventional, homogeneously branched linear ethylene interpolymers, described by Elston in U.S. Pat. No. 3,645,992, and, moreover, they are not in the same class as conventional heterogeneous Ziegler-Natta catalyst polymerized linear ethylene polymers (for example, ultra low density polyethylene (ULDPE), linear low density polyethylene (LLDPE) or high density polyethylene (HDPE), made, for example, using the technique disclosed by Anderson et al., in U.S. Pat. No. 4,076,698); nor are they in the same class as high pressure, free-radical initiated, highly branched polyethylenes, such as, for example, low density polyethylene (LDPE), ethylene-acrylic acid (EAA) copolymers and ethylene vinyl acetate (EVA) copolymers.

Platy Filler

Any inert material with a generally disc-like shape can be used as the platy filler in the TPO compositions of this invention. Typically and preferably, the platy filler is an inert mineral powder, e.g., talc, kaolin clay or mica, and more preferably it is a platy talc. Common platy talcs and kaolin clays are identified in Tables 3 and 4, respectively. The particular grade of platy talc is selected to have sufficient reinforcing strength, so as to impart or maintain the desired flex modulus and HDT of the final composition, without exceeding the density of the polymeric resin that the composition is intended to replace. Typically, the density of a commercial grade resins is about 1.13 g/ml. For compositions made with the high crystallinity, propylene homopolymers and EAO elastomers of this invention, a filler loading of about 30 weight percent is typical, although more or less can be used as desired.

TABLE 3

Common Platy Talcs

| Product Name | Supplier | Hegman Grind | Surface Area, B.E.T. $m^2/g$ | Median Diameter, microns | Brightness |
|---|---|---|---|---|---|
| ABT 2500 | Specialty Minerals, Inc. | 5.5 | 5.5 | 2.3 average | N.A |
| HAR V3410 | Luzenac | N.A. | 16 | 2.0 | N.A. |
| Nicron 674 | Luzenac | 6.5 | 14 | 1.9 | N.A. |
| Cimpact 710 | Luzenac | 7 | N.A. | 1.7 | 91 |
| JetFil 700 | Luzenac | 6.5 | N.A. | 1.5 | 88 |
| JetFil 625 | Luzenac | 6 | N.A. | 2.2 | 88 |

TABLE 4

Common Platy Kaolin Clays

| Product Name | Supplier | Hegman Grind | Surface Area, B.E.T. $m^2/g$ | Median Diameter, microns | Brightness |
|---|---|---|---|---|---|
| Polyfil DL | J. M. Huber | 5.5 | 5.5 | 1.3 | 91 |
| Polyfil DLX | J. M. Huber | N.A. | N.A. | N.A. | N.A. |
| Kaopaque 10 | Imerys | N.A. | N.A. | N.A. | N.A. |

During the processing of the inventive compositions, it is noted that under a flow stress, the plate shaped filler will generally align parallel to the direction of the composition flow. This flow pattern helps to reduce the shrinkage of the composition in the flow direction, and makes it possible for the filler to reinforce the resulting polymeric product, increasing both the heat deflection temperature and the flexural modulus. The effectiveness of particular filler can be determined by fitting a line to data taken at various levels of filler addition. The slope of the line, in units of "percent increase in property" divided by "weight percent filler addition" is a measure of the particular filler's efficiency in increasing either heat deflection temperature or flexural modulus.

The reinforcing efficiency of the filler on the composition is evaluated by measuring the effect of a 20 weight percent addition of the filler on the flex modulus and HDT of the blend of polypropylene and EAO. A flex modulus efficiency factor, with units of percent increase in modulus to percent loading of filler, can then be calculated. This factor is relatively linear in a filler loading range from about 10 to 40 weight percent. A related heat deflection efficiency factor can similarly be calculated for each filler grade by compounding the high crystallinity isotactic propylene homopolymer and EAO elastomeric impact modifier with the reinforcing filler at 20 weight percent and without the filler. The heat deflection efficiency factor is less linear than the flex modulus efficiency factor, and more sensitive to the specific grade of polypropylene and EAO. As a result, fillers of interest are typically benchmarked at a 20 weight percent loading with the highly crystalline isotactic homopolymer and EAO elastomeric impact modifier of this invention. Preferred reinforcing filler grades, for example, platy talc, of this invention have a heat deflection efficiency factor of greater than, or equal to, about 1.5, more preferably greater than about 1.7, and most preferably greater than about 1.9, when formulated at 20 weight percent loadings in the highly crystalline isotactic propylene homopolymer and EAO elastomeric impact modifier. Simultaneously, the preferred reinforcing filler grades of this invention have a flexural modulus efficiency factor greater than about 3, more preferably greater than about 3.5 and most preferably greater than about 4.

In one embodiment, the medium particle size is from 0.1 micron to 50 microns, preferably from 0.5 micron to 25 microns, and more preferably from 1 micron to 10 microns. All individual values and subranges from 0.1 micron to 50 microns are included herein and disclosed herein.

Preparation of Compositions

As discussed above, the TPO compositions of this invention contain at least one propylene homopolymer, at least one ethylene/α-olefin interpolymer and at least one platy filler. While such compositions can be prepared by any one of a number of different processes, generally these processes fall into one of two categories, that is, post-reactor blending, in-reactor blending, or combinations thereof. Illustrative of the former are melt extruders into which two or more solid polymers are fed and physically mixed into a substantially homogeneous composition, and multiple solution, slurry or gas-phase reactors, arranged in a parallel array, and in which, the output from each is blended with one another to form a substantially homogeneous composition, which is ultimately recovered in solid form. Illustrative of the latter are multiple reactors connected in series, and single reactors charged with two or more catalysts. Preferably, the compositions are prepared by post-reactor blending.

Typically the propylene homopolymer and ethylene/α-olefin interpolymer are blended with one another, before the addition of the filler, although the filler may first be blended with one or the other of the polymers prior to the addition of the other polymer. The filler can be added neat or as a masterbatch, based on either polymer. All components of the composition are blended with one another, until a substantially homogeneous composition is obtained. Standard mixers and extruders can be used for the blending. The compositions of this invention can contain other components as well; for example, pigments, anti-oxidants, processing aids and the like.

The TPO compositions of this invention are used in the same manner as conventional polycarbonate bases and polystyrene based compositions. In particular, the compositions of this invention are well suited for the manufacture of structures used in the preparation of soft touch instrument panels and like articles of manufacture.

Composition

The inventive composition preferably contains from 60 to 90 weight percent, preferably from 65 to 85 weight percent, and more preferably from 70 to 75 weight percent of the propylene homopolymer, based on the sum weight of the propylene homopolymer and ethylene/α-olefin interpolymer. All individual values and subranges from 60 to 90 weight percent (polypropylene homopolymer) are included herein and disclosed herein. The inventive composition preferably contains from 10 to 40 weight percent, preferably from 15 to 37 weight percent, and more preferably from 20 to 35 weight percent of the ethylene/α-olefin interpolymer, based on the sum weight of the propylene homopolymer and ethylene/α-olefin interpolymer. All individual values and subranges from 10 to 40 weight percent (ethylene/α-olefin interpolymer) are included herein and disclosed herein.

In one embodiment, the composition contains from 25 to 50 weight percent, preferably from 30 to 45 weight percent, and more preferably from 35 to 40 weight percent platy filler, based on the total weight of the composition. All individual values and subranges from 25 to 50 weight percent (platy filler) are included herein and disclosed herein.

In another embodiment, the composition has a crystallization temperature, Tc, greater than, or equal to, 110° C., preferably greater than, or equal to, 120° C., and more preferably greater than, or equal to, 130° C., and most preferably greater than, or equal to, 140° C.

In another embodiment, the composition has a HDT, as measured by ASTM D648, than, or equal to, 110° C., preferably greater than, or equal to, 120° C., and more preferably greater than, or equal to, 130° C., and most preferably greater than, or equal to, 140° C.

In another embodiment, the composition does not contain another propylene-based polymer, other than the propylene homopolymer component.

In another embodiment, the composition contains greater than, or equal to, 50 weight percent, preferably greater than, or equal to 60 weight percent, and more preferably greater than, or equal to, 70 weight percent of the propylene homopolymer, based on the total weight of the composition.

In another embodiment, the composition contains less than, or equal to, 40 weight percent, preferably less than, or equal to 35 weight percent, and more preferably less than, or equal to, 30 weight percent of the ethylene/α-olefin interpolymer, based on the total weight of the composition.

In another embodiment, the composition contains no copolymers containing only ethylene and propylene monomer units.

In another embodiment, the composition contains no styrene block copolymers.

In another embodiment, the composition contain only one ethylene/α-olefin interpolymer.

In another embodiment, the composition does not contain an EPDM polymer.

In another embodiment, the composition does not contain an EPR polymer.

In another embodiment, the composition does not contain a block copolymer.

The composition may further comprise at least one additive of the type conventionally added to polymers or polymer compositions. These additives include, for example, process oils; antioxidants; surface tension modifiers; UV stabilizers; flame retardants, scratch/mar additives, such as polydimethyl siloxane (PDMS) or functionalized polydimethyl siloxane or IRGASURF® SR 100 (available from Ciba Specialty Chemicals) or scratch mar formulations containing erucamide; antiblock agents; dispersants; blowing agents; linear or substantially linear EAOs; LDPE; LLDPE; lubricants; crosslinking agents such as peroxides; antimicrobial agents such as organometallics, isothiazolones, organosulfurs and mercaptans; antioxidants such as phenolics, secondary amines, phosphites and thioesters; antistatic agents such as quaternary ammonium compounds, amines, and ethoxylated, propoxylated or glycerol compounds. Functionalized polydimethyl siloxanes include, but are not limited to, hydroxyl functionalized polydimethyl siloxane, amine functionalized polydimethyl siloxane, vinyl functionalized polydimethyl siloxane, aryl functionalized polydimethyl siloxane, alkyl functionalized polydimethyl siloxane, carboxyl functionalized polydimethyl siloxane, mercaptan functionalized polydimethyl siloxane, and derivatives of the same.

The inventive compositions may also contain an additional additive. Additional additives include, but are not limited to, hydrolytic stabilizers; lubricants such as fatty acids, fatty alcohols, esters, fatty amides, metallic stearates, paraffinic and microcrystalline waxes, silicones and orthophosphoric acid esters; mold release agents, such as fine-particle or powdered solids, soaps, waxes, silicones, polyglycols and complex esters such as trimethylolpropane tristearate or pentaerythritol tetrastearate; pigments, dyes and colorants; plasticizers such as esters of dibasic acids (or their anhydrides) with monohydric alcohols such as o-phthalates, adipates and benzoates; heat stabilizers such as organotin mercaptides, an octyl ester of thioglycolic acid and a barium or cadmium carboxylate; ultraviolet light stabilizers used as a hindered amine, an o-hydroxy-phenylbenzotriazole, a 2-hydroxy, 4-alkoxyenzophenone, a salicylate, a cynoacrylate, a nickel chelate and a benzylidene malonate and oxalanilide; and zeolites, molecular sieves, anti-stat agents and other known deodorizers.

A preferred hindered phenolic antioxidant is Irganox® 1076 antioxidant, available from Ciba Specialty Chemicals. Skilled artisans can readily select any suitable combination of additives and additive amounts, as well as the method of incorporating the additive(s) into the composition, without undue experimentation. Typically, each of the above additives, if used, does not exceed 45 weight percent, based on total composition weight, and are advantageously from about 0.001 to about 20 weight percent, preferably from 0.01 to 15 weight percent and more preferably from 0.1 to 10 weight percent.

In one embodiment of the invention, an inventive composition includes at least one polydimethylsiloxane (PDMS) to improve the scratch mar resistance of the resulting product. The polydimethylsiloxane is typically present from 0.1 to 10 weight percent, based on the weight of the polymer composition. Suitable polydimethylsiloxanes include those having a viscosity at 25° C. of greater than 100,000 centistokes, and more preferably from $1\times10^6$ to $2.5\times10^6$ centistokes. In a further embodiment, the composition also includes an ethylene homopolymer or ethylene interpolymer grafted with maleic anhydride or succinic anhydride groups, and preferably the grafted ethylene homopolymer or interpolymer comprises less than 20 percent of said composition. In yet a further embodiment, the composition also includes at least one additive, such as a plasticizer, a pigment or colorant, a UV stabilizer, or a filler. Fillers may include calcined or uncalcined fillers. Suitable fillers include, but are not limited to calcium carbonate and wollastonite. Suitable components for scratch mar resistant formulations are described in more detail in U.S. Pat. No. 5,902,854, the entire contents of which are incorporated herein by reference.

Additional scratch mar formulations useful in the compositions of the invention contain IRGASURF® SR 100 with one or more additives as described herein. A particularly suitable formulation contains an aliphatic amide in a polyethylene carrier, such as IRGASURF® SR 100 with one or more fillers, such as wollastonite, and an ethylene homopolymer or interpolymer grafted with maleic anhydride or succinic anhydride groups. Other scratch resistant polyolefin formulations are described in U.S. Publication No. 2006009554 (equivalent to WO 2006/003127), which is incorporated herein in its entirety by reference.

In a particularly preferred embodiment, the compositions contain a scratch mar concentrate, which, in turn, contains from 10 to 30 weight percent of at least one colorant and/or UV stabilizer, from 5 to 15 weight percent of at least one polydimethylsiloxane, from 30 to 50 weight percent of at least one filler, and from 10 to 35 weight percent of at least one ethylene homopolymer or interpolymer grafted with maleic anhydride or succinic anhydride groups. The weight percentages based on the total weight of the scratch mar concentrate.

Automotive Articles

Articles may be prepared by a variety of processes. They may be injection molded, blow molded, compression molded, low pressure injection molded, extruded and then thermoformed by either male or female vacuum thermoforming, or prepared hybrid process such as low pressure molding wherein a blanket of still molten TPO material is placed against the back of a skin foam composite and pressed under low pressure to form the skin and bond it to the hard TPO substrate.

Articles, or components of such articles, that may be made by these processes include, but are not limited to, instrument panel retainers, toppers, valence panels (windshield close-out panel), instrument cluster bezels, center console bezels, the interior and exterior of glove boxes, the columns and posts, A, B and C pillars, all the assorted storage areas and covers, and under the hood parts, such as fan housings.

The inventive compositions are sufficiently fluid at molding temperatures to fill in a mold. Overall, the inventive compositions have excellent moldability and high rigidity, and can be used to form parts with an excellent mechanical strength, impact resistance, ductility, and thermal deformation resistance. Such parts have an excellent appearance, and have reduced dimensional changes, at the time of molding, and reduced coefficients of thermal linear expansion. The compositions are capable of producing injection molded parts having a wall thickness smaller than that of the parts prepared from conventional PC/ABS resins. In addition, such parts are on the order of seven weight percent lighter compared to a polycarbonate/ABS blend.

The automotive parts of the invention can be prepared using injection molding tooling designed for conventional PC/ABS resins. Thus, the inventive parts can be prepared using existing automotive equipment.

DEFINITIONS

Any numerical range recited herein, includes all values from the lower value and the upper value, in increments of one unit, provided that there is a separation of at least two units between any lower value and any higher value. As an example, if it is stated that a compositional, physical or other property, such as, for example, molecular weight, melt index, etc., is from 100 to 1,000, it is intended that all individual values, such as 100, 101, 102, etc., and sub ranges, such as 100 to 144, 155 to 170, 197 to 200, etc., are expressly enumerated in this specification. For ranges containing values which are less than one, or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this application. Numerical ranges have been recited, as discussed herein, in reference to density, weight percent of component, tan delta, molecular weights and other properties.

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer, usually employed to refer to polymers prepared from only one type of monomer, and the term interpolymer as defined hereinafter.

As discussed above, the term "interpolymer," as used herein, refers to polymers prepared by the polymerization of at least two different types of monomers. The generic term interpolymer thus includes copolymers, usually employed to refer to polymers prepared from two different types of monomers, and polymers prepared from more than two different types of monomers.

The term "ethylene/α-olefin interpolymer," "ethylene polymer," or similar terms, as used herein, refers to a polymer formed from predominantly (greater than 50 mole percent) ethylene monomeric units. Mole percentage is based on the total moles of polymerizable monomers.

The terms "blend" or "polymer blend," as used herein, mean a composition of two or more polymers. Such a blend may or may not be miscible. Such a blend may or may not be phase separated. Such a blend may or may not contain one or more domain configurations, as determined from transmission electron spectroscopy.

Measurements

By the term "MI," is meant melt index, I2 or $I_2$, in g/10 min, measured using ASTM D-1238, Condition 190° C./2.16 kg for polyethylene-based polymers, and 230° C./2.16 kg for polypropylene-based polymers.

Density is measured in accordance with ASTM D-792. The density measured was a "quick density", meaning that the density was determined after 1 hour from the time of molding.

Gel Permeation Chromatography

The average molecular weights and molecular weight distributions for ethylene-base polymers were determined with a gel permeation chromatographic system, consisting of a Polymer Laboratories Model 200 series high temperature chromatograph. The column and carousel compartments were operated at 140° C. for polyethylene-based polymers. The columns used, were three Polymer Laboratories 10-micron Mixed-B columns. The solvent was 1,2,4 trichlorobenzene. The samples were prepared at a concentration of 0.1 gram of polymer in 50 milliliters of solvent. The solvent, used as the mobile phase, and to prepare the samples, contained 200 ppm of butylated hydroxytoluene (BHT). Ethylene-base polymers were prepared by agitating lightly for 2 hours at 160° C., and propylene-base polymers were dissolved for 2.5 hours. The injection volume was 100 microliters, and the flow rate was 1.0 milliliters/minute. Calibration of the GPC column set was performed with narrow molecular weight distribution polystyrene standards, purchased from Polymer Laboratories (UK), with molecular weights ranging from 580 to 8,400,000. The polystyrene standard peak molecular weights were converted to polyethylene molecular weights using the following equation (as described in Williams and Ward, J. Polym. Sci., Polym. Let., 6, 621 (1968)):

$$M\text{polyethylene} = A \times (M\text{polystyrene})^B,$$

where M is the molecular weight, A has a value of 0.4315 and B is equal to 1.0.

Polyethylene equivalent molecular weight calculations were performed using Viscotek TriSEC software Version 3.0. The molecular weights for polypropylene-based polymers can be determined using Mark-Houwink ratios according to ASTM D6474.9714-1, where, for polystyrene a=0.702 and log K=−3.9, and for polypropylene, a=0.725 and log K=−3.721. For polypropylene-based samples, the column and carousel compartments were operated at 160° C.

Differential Scanning Calorimetry

Differential Scanning Calorimetry (DSC) can be used to measure crystallinity in polyethylene (PE) based samples and polypropylene (PP) based samples. A sample is pressed into a thin film at a temperature of 190° C. About five to eight milligrams of film sample is weighed and placed in a DSC pan. The lid is crimped on the pan to ensure a closed atmosphere. The sample pan is placed in a DSC cell, and then heated, at a rate of approximately 10° C./min, to a temperature of around 180-200° C. for PE (230° C. for PP). The sample is kept at this temperature for three minutes. Then the sample is cooled at a rate of 110° C./min to −90° C. for PE (−90° C. for PP), and kept isothermally at that temperature for three to five minutes. The sample is next heated at a rate of 10° C./min until complete melting (second heat; around 180° C. for PE and 230° C. for PP). Unless otherwise stated, melting point(s) ($T_m$) of each polymer sample is determined from the second heat curve obtained from DSC, as described above. The crystallization temperature ($T_c$) is measured from the first cooling curve.

The following examples illustrate, but do not, either explicitly or by implication, limit the present invention. Unless otherwise indicated, all parts and percentages are by weight.

Experimental

Five grades of polypropylene are described in Table 5 below.

Profax PD 702 is a conventional propylene homopolymer sold by Basell.

JP 707 is a conventional in-situ prepared, heterophasic impact propylene copolymer of propylene and ethylene sold by Mitsui Chemicals, Inc.

Accpro 9934X, now identified as Innovene H35Z-02, is a nucleated, 35 MFR, highly crystalline isotactic propylene homopolymer.

D118 is a developmental grade of nucleated highly crystalline propylene homopolymer available from The Dow Chemical Company. This polymer has a Mn of about 41,000 g/mole, an Mw of about 183,000 g/mole and a Mw/Mn of about 4.5.

CDC-1 is a version of D118 propylene homopolymer without the nucleator that was vis-broken with shear and peroxide to a melt index of 35.

CDC-2 is another version of D118 propylene homopolymer, but this version was prepared with a nucleating agent and then vis-broken to MFR of 35.

TABLE 5

Polypropylene Properties

| | Supplier | Flexural Modulus, 1% secant, MPa | Flexural Modulus, 1% secant, PSI | Heat Deflection Temperature, 0.455 MPa (° C.) | MFR, 2.16 kg @ 230° C. (g/10 min) |
|---|---|---|---|---|---|
| PD 702 | Basell | 1255 | 181908 | 87.3 | 35 |
| JP 707 | Mitsui | 1207 | 175008 | 86.5 | 35 |
| H35Z-02 | Polymers and Olefins America | 2248 | 325939 | 135.9 | 35 |
| D118 | Dow Chemical | 2019 | 292797 | 130.6 | 8 |
| CDC0501 | Dow Chemical | 1665 | 241471 | 110.0 | 35 |
| CDC0505 | Dow Chemical | 2248 | 325939 | 135.9 | 35 |

The effect of nucleation can be clearly seen by examining the physical properties of the CDC grades.

Many EAO elastomeric impact modifiers are available for use in the practice of this invention, including ethylene/octene, ethylene/butene and ethylene/propene copolymers.

ENR 7380 is a preferred EAO elastomer for impact modification because of its balance of low Tg, low tan delta measured at 190° C. and 0.1 radians per second, and a differential between its melting point and HDT of 10.3° C.

In the compositions described below, the polypropylene homopolymer and the ethylene/α-olefin were mixed in a twin screw extruder, without a platy filler. Polymers were fed at 30 pounds per hour combined feed rate. The screws were turned at 300 rpm. Temperatures were set at 200° C. for the barrel zones after the initial feed zone and for the transition and die. Pellets were prepared with a Gala underwater pelletizer.

Impact modification results in a drop of both flexural modulus and HDT of the polypropylene as shown in Tables 6 and 7 below. All formulations were prepared utilizing 70 percent by weight of the chosen polypropylene and 30 percent by weight of the chosen EAO; each percentage by weight is based on the sum weight of the polypropylene and the EAO. The 8000 series Engage™ elastomers are copolymers of ethylene and 1-octene. The 7000 series Engage™ elastomers are copolymers of ethylene and 1-butene. Engage™ 8100 has a Mn of about 75,000 g/mole, an Mw of about 150,000 g/mole and a Mw/Mn of 2.0. Engage™ 8150 has a Mn of about 87,000 g/mole, an Mw of about 176,000 g/mole and a Mw/Mn of 2.0. ENR™ 7380 has a Mn of about 82,000 g/mole, an Mw of about 174,000 g/mole and a Mw/Mn of 2.1.

TABLE 6

Effect of Impact Modification on Flexural Modulus, 1% Secant Modulus, MPa

| | PD 702 homopolymer | | J707PT copolymer | |
|---|---|---|---|---|
| Elastomer | Unmodified Polypropylene | Impact Modified | Unmodified Polypropylene | Impact Modified |
| Engage ™ 8003 | 1254.5 | 732.4 | 1207.0 | 723.2 |
| Engage ™ 8150 | 1254.5 | 620.9 | 1207.0 | 651.3 |
| ENR 7467 | 1254.5 | 763.1 | 1207.0 | 715.0 |
| ENR 7447 | 1254.5 | 809.4 | 1207.0 | 707.2 |
| Engage ™ 8200 | 1254.5 | 786.6 | 1207.0 | 698.8 |
| ENR 7270 | 1254.5 | 757.1 | 1207.0 | 729.8 |
| Engage ™ 8100 | 1254.5 | 664.7 | 1207.0 | 655.2 |
| Engage ™ 8842 | 1254.5 | 720.8 | 1207.0 | 628.7 |
| Average | | 731.9 | | 688.6 |
| Mean Decrease | | 42% | | 43% |

The data of Table 6 shows that the percent loss in flexural modulus (1% secant modulus), does not vary significantly within this group of elastomers. Similar behavior is seen with the percent loss in HDT as shown in Table 7 below (about 25 percent of the HDT, regardless of the polypropylene and independent of the elastomer). Once again the properties shown are for neat polymer blends of 70 weight percent of the selected polypropylene and 30 weight percent of the selected elastomer.

TABLE 7

Effect of Impact Modification on Heat Deflection Temperature (° C.)

| | PD 702 homopolymer | | J707PT copolymer | |
|---|---|---|---|---|
| Elastomer | Unmodified Polypropylene | Impact Modified | Unmodified Polypropylene | Impact Modified |
| Engage ™ 8003 | 87.3 | 65.5 | 86.5 | 65.8 |
| Engage ™ 8150 | 87.3 | 60.3 | 86.5 | 62.1 |
| ENR 7467 | 87.3 | 66.0 | 86.5 | 67.7 |
| ENR 7447 | 87.3 | 67.8 | 86.5 | 67.9 |
| Engage ™ 8200 | 87.3 | 67.6 | 86.5 | 68.0 |
| ENR 7270 | 87.3 | 64.4 | 86.5 | 64.1 |
| Engage ™ 8100 | 87.3 | 63.3 | 86.5 | 64.0 |
| Engage ™ 8842 | 87.3 | 67.3 | 86.5 | 65.9 |

TABLE 7-continued

Effect of Impact Modification on Heat Deflection Temperature (° C.)

| | PD 702 homopolymer | | J707PT copolymer | |
|---|---|---|---|---|
| Elastomer | Unmodified Polypropylene | Impact Modified | Unmodified Polypropylene | Impact Modified |
| Average | 87.3 | 65.3 | 86.5 | 65.7 |
| Average Decrease | | 25% | | 24% |

The importance of platy fillers is their reinforcing nature. Table 8 below shows the effect of talc addition, at a 10 weight percent level, on the flexural modulus of each of the conventional polypropylene grades. The second part of the table shows how 10 and 20 weight percent levels of three different talcs increase the flex modulus of a random copolymer polypropylene, impact modified with various EAO grades at 30 percent, by weight, on a polymer basis. In each case, the weight percent of talc is based on the sum weight of the polypropylene, the EAO and the talc.

One skilled in the art, would know how to formulate compositions (percentages of polypropylene, EAO and filler components) to compensate for additional additives, such as color concentrates and other additive concentrates.

For the study of the effects of individual grades of talc, two grades of polypropylene (a homopolymer and an impact copolymer) were impact modified with 8 different grades of EAO and 3 different grades of talc. The polypropylene grades were a 35 MFR homopolymer, Basell Profax PD702, and a 35 MFR impact copolymer, J707PT (heterophasic EPR or PER impact polypropylene, prepared in the reactor and sold by Grand Polymers).

The compounds were prepared by feeding the selected polypropylene, the selected elastomer, and the selected talc to a twin screw extruder under conditions used in the previous study. The ratio of polypropylene to elastomer was fixed at 70 percent by weight polypropylene to 30 percent by weight elastomer; each percentage by weight is based on the sum weight of the polypropylene and the EAO. When compounds were prepared from the J707PT, this practice actually resulted in two elastomers being present in the final compound, the first from the two phase polypropylene copolymer, and the second from the compounding.

The ratio of polypropylene to ethylene elastomer, fed to the extruder, was kept constant at 70 to 30 parts by weight. The polymer feed was adjusted, and the talc was increased, such that the talc content hit the target amount. Thus a formulation containing a total of 10 weight percent talc was prepared with 63 weight percent polypropylene, and 27 weight percent elastomer, and 10 weight percent talc. Similarly, a 20 weight percent talc formulation contained 56 weight percent of the chosen polypropylene grade, 24 weight percent of the chosen elastomer, and 20 weight percent of the chosen talc.

TABLE 8

Percent Increase in 1% Secant Modulus with Addition of 10 Percent and 20 Percent Talc Loadings to Blends of Non-Nucleated Polypropylene and Ethylene Alpha Olefins

| | ABT-2500 10% | | HAR 3410 | | Nicron 674 | | Cimpact 710 | |
|---|---|---|---|---|---|---|---|---|
| Elastomer | Homo | Impact Co | 10% | 20% | 10% | 20% | 10% | 20% |
| Engage ™ 8003 | 49.00% | 40.00% | 51.00% | 88.00% | 44.00% | 63.00% | 42.00% | 78.00% |
| Engage ™ 8150 | 49.00% | 48.00% | 54.00% | 88.00% | 52.00% | 84.00% | 59.00% | 102.00% |

TABLE 8-continued

Percent Increase in 1% Secant Modulus with Addition of 10 Percent and 20 Percent Talc Loadings to Blends of Non-Nucleated Polypropylene and Ethylene Alpha Olefins

| | ABT-2500 10% | | HAR 3410 | | Nicron 674 | | Cimpact 710 | |
|---|---|---|---|---|---|---|---|---|
| Elastomer | Homo | Impact Co | 10% | 20% | 10% | 20% | 10% | 20% |
| ENR 7467 | 22.00% | 18.00% | 27.00% | 65.00% | 41.00% | 60.00% | 42.00% | 79.00% |
| ENR 7447 | 14.00% | 16.00% | 25.00% | 47.00% | 48.00% | 67.00% | 51.00% | 84.00% |
| Engage ™ 8200 | 21.00% | 19.00% | 30.00% | 59.00% | 35.00% | 61.00% | 40.00% | 79.00% |
| ENR 7270 | 40.00% | 40.00% | 43.00% | 68.00% | 48.00% | 71.00% | 51.00% | 94.00% |
| Engage ™ 8100 | 37.00% | 42.00% | 56.00% | 95.00% | 62.00% | 93.00% | 63.00% | 110.00% |
| Engage ™ 8842 | 28.00% | 30.00% | 59.00% | 105.00% | 57.00% | 74.00% | 50.00% | 92.00% |
| Average | 32.50% | 31.63% | 43.13% | 76.88% | 48.38% | 71.63% | 49.75% | 89.75% |

Another way to express this same information that normalizes the response to individual grades of talc at various levels, is to express the same information as the percent increase in flex modulus per percent loading of talc. This description is defined as the nonnucleated flexural modulus efficiency factor, it is dimensionless, and it is reported in Table 9 below.

TABLE 9

Non-Nucleated Flexural Modulus Efficiency Factor

| | ABT-2500 10% | | HAR 3410 | | Nicron 674 | | Cimpact 710 | |
|---|---|---|---|---|---|---|---|---|
| Elastomer | Homo | Impact Co | 10% | 20% | 10% | 20% | 10% | 20% |
| Engage ™ 8003 | 4.90 | 4.00 | 5.10 | 4.40 | 4.40 | 3.15 | 4.20 | 3.90 |
| Engage ™ 8150 | 4.90 | 4.80 | 5.40 | 4.40 | 5.20 | 4.20 | 5.90 | 5.10 |
| ENR 7467 | 2.20 | 1.80 | 2.70 | 3.25 | 4.10 | 3.00 | 4.20 | 3.95 |
| ENR 7447 | 1.40 | 1.60 | 2.50 | 2.35 | 4.80 | 3.35 | 5.10 | 4.20 |
| Engage ™ 8200 | 2.10 | 1.90 | 3.00 | 2.95 | 3.50 | 3.05 | 4.00 | 3.95 |
| ENR 7270 | 4.00 | 4.00 | 4.30 | 3.40 | 4.80 | 3.55 | 5.10 | 4.70 |
| Engage ™ 8100 | 3.70 | 4.20 | 5.60 | 4.75 | 6.20 | 4.65 | 6.30 | 5.50 |
| Engage ™ 8842 | 2.80 | 3.00 | 5.90 | 5.25 | 5.70 | 3.70 | 5.00 | 4.60 |
| Average | 3.25 | 3.16 | 4.31 | 3.84 | 4.84 | 3.58 | 4.98 | 4.49 |

A similar study can be done on the effect of reinforcing filler on HDT. Because the difference between the HDT of the conventional grades of polypropylene and EAO is relatively small, the effect of impact modification is less than is expected for the highly crystalline isotactic homopolymer polypropylene grades, as reported in Table 10 below.

TABLE 10

Non-Nucleated HDT Efficiency Factor

| | ABT-2500 10% | | HAR 3410 | | Nicron 674 | | Cimpact 710 | |
|---|---|---|---|---|---|---|---|---|
| Elastomer | Homo | Impact Co | 10% | 20% | 10% | 20% | 10% | 20% |
| Engage ™ 8003 | 3.00 | 2.10 | 3.50 | 3.10 | 2.00 | 2.25 | 3.50 | 2.80 |
| Engage ™ 8150 | 2.30 | 2.80 | 3.50 | 2.85 | 2.70 | 2.85 | 3.90 | 2.90 |
| ENR 7467 | 1.90 | 1.50 | 2.40 | 2.25 | 2.40 | 1.70 | 2.90 | 2.35 |
| ENR 7447 | 2.00 | 2.10 | 0.70 | 1.15 | 2.50 | 1.70 | 2.10 | 2.30 |
| Engage ™ 8200 | 2.10 | 2.00 | 2.00 | 1.80 | 2.60 | 2.10 | 2.50 | 2.30 |
| ENR 7270 | 2.60 | 2.60 | 2.90 | 1.90 | 3.40 | 2.25 | 2.70 | 2.80 |
| Engage ™ 8100 | 1.70 | 2.30 | 3.60 | 2.55 | 3.30 | 2.65 | 3.60 | 2.70 |
| Engage ™ 8842 | 1.60 | 1.70 | 3.40 | 3.00 | 3.50 | 2.25 | 3.10 | 2.55 |
| Average | 2.15 | 2.14 | 2.75 | 2.33 | 2.80 | 2.22 | 3.04 | 2.59 |

As can be seen in Tables 9 and 10 above, the reinforcing filler can be benchmarked for its efficiency at increasing the HDT (ASTM D648, 0.445 MPa) and the 1% secant Flexural Modulus (ASTM D790). On the basis of these efficiency factors, one can compare filler choices to prepare a TPO composition with properties equivalent to those of conventional resins, such as PC/ABS. Of the platy talc grades reported in the above tables, Cimpact 710 offers the best balance of properties.

The grades of polypropylene reported above were not nucleated. Compounding a TPO composition with talc is known to result in nucleation of the polypropylene because of the large surface area and irregular shape of the talc. Therefore, some of the benefit from the talc addition is the nucleation effect of the talc. Since most of the highly crystalline isotactic homopolymer polypropylene grades, as sold, are nucleated to accentuate their stiffness (flex modulus) and HDT, the performance of both nucleated and non nucleated grades was evaluated. The results are reported in Table 11 below.

For this study we chose to use a highly crystalline homopolymer polypropylene with a MFR of 35. In the first instance this grade was produced without nucleating agent and was labeled CDC0501. This material was prepared again, only this time nucleating agent was added prior to vis-breaking the polymer. This nucleate grade was labeled CDC0505. In both cases, impact modified blends were prepared utilizing 70 percent by weight of the respective highly crystalline polypropylene, and 30 percent by weight of the ethylene/1-butene copolymer, ENR 7380, but with no talc feed to the extruder. In subsequent runs each highly crystalline polypropylene was made into an impact modified, talc filled compound by feeding the polypropylene, the elastomer and the talc to the twin screw extruder at the appropriate ratios. The 20 weight percent talc-containing compositions received feeds of 56 weight percent polypropylene, 24 weight percent ENR 7380, and 20 weight percent talc. The 30 weight percent talc-containing compositions received feeds of 49 weight percent polypropylene, 21 weight percent ENR 7380, and 30 weight percent talc. Finally, the 40 weight percent talc-containing compositions received feeds of 42 weight percent polypropylene, 18 weight percent ENR 7380, and 40 weight percent talc. The properties were measured and reported in Table 11.

The benefits of nucleation are clearly visible in the neat propylene homopolymer resulting in an HDT that is 25.9 degrees higher and a 1% secant modulus that is nearly 85,000 psi higher. The benefits decrease after impact modification with 30 percent by weight of the total polymer addition (polypropylene and EAO) of ENR 7380 to make a TPO composition. The flexural modulus difference is less than 30,000 psi, and the HDT difference is less than 11° C. Once the TPO compositions are talc filled, the advantage of nucleation is lost. These data allow for the benchmarking of a flexural modulus of 142057 psi and an HDT of 85.6° C. for evaluating the reinforcing effects of reinforcing fillers. This is useful because the most common commercial grades of highly crystalline isotactic propylene homopolymer are all nucleated for the boost in flex modulus and HDT.

With the correlation developed above, alternative reinforcing platy fillers can be screened in a standard formulation based on the more widely available nucleated highly crystalline isotactic propylene homopolymer. The polymer formulation is 70 weight percent of the nucleated, highly crystalline isotactic propylene homopolymer to 30 weight percent EAO elastomeric impact modifier. For the following comparison of filler efficiency, Accpro 9934X polypropylene and ENR 7380 EAO were used. The several grades of platy fillers examined, included delaminated kaolin clay and platy talc derived from the Canadian sources, as described in Table 12 below.

TABLE 11

Consequences of Impact Modification and Talc Loading for Nucleated and Non-Nucleated High Crystallinity Isotactic Homopolymer Polypropylene

| | Polypropylene | | | |
| --- | --- | --- | --- | --- |
| | Non-nucleated Highly Crystalline Isotactic Propylene Homopolymer | | Nucleated Highly Crystalline Isotactic Propylene Homopolymer | |
| Property | Flex Modulus, 1% secant, psi | Heat Distortion Temperature, ° C. | Flex Modulus, 1% secant, psi | Heat Distortion Temperature, ° C. |
| Polypropylene Only | 241471 | 110.0 | 325939 | 135.9 |
| Impact Modified Polypropylene | 142057 | 85.6 | 171890 | 96.3 |
| Impact Modified Polypropylene with 20% talc | 265843 | 124.2 | 259625 | 120.5 |
| Impact Modified Polypropylene with 30% talc | 327702 | 133.2 | 300046 | 133.6 |
| Impact Modified Polypropylene with 40% talc | 385188 | 142.5 | 341231* | 136.6* |

*35% Talc addition.

TABLE 12

Effect of Platy Fillers on EAO Modified PP Homopolymer

| Filler | Filler Loading (wt %) | HDT, 0.455 MPa (° C.) | 1% Sec Mod (psi) |
|---|---|---|---|
| Polyfil DL - Delaminated Kaolin | 20 | 100.0 | 171890 |
| Polyfill DLX - Delaminated Kaolin | 20 | 96.7 | 175195 |
| Kaopaque 10-5 - Platy Kaolin | 20 | 94.8 | 183110 |
| JetFil 625C - Platy Talc | 20 | 124.6 | 229974 |
| JetFil 700C - Platy Talc | 20 | 109.6 | 213846 |

Using 142057 psi as the flex modulus for the non-nucleated, non-filled, impact modified formulation, and a non-nucleated flex modulus efficiency factor of 3, a 20 weight percent filler loading should bring the flexural modulus to 227,291 psi. Similarly, a reinforcing filler meeting the requirement of this invention of an HDT efficiency factor of 1.5, would simultaneously have an HDT of 111.3° C. As shown in Table 12, some of the JetFil Platy talc grades meet these requirements, but the kaolin grades do not.

The formulation can be adjusted by increasing the elastomer (EAO) content as a percentage of total polymer (polypropylene plus elastomer), in order to improve the low temperature impact resistance. The results of this are shown as Version A. Alternatively, both the elastomer content and the talc content as a percentage of the total compound (polypropylene plus elastomer plus talc). The results of this change are shown as Version B.

TABLE 13

Adjusting the Composition to Adjust Properties

| Formulation | Baseline | Version A | Version B |
|---|---|---|---|
| High Crystallinity PP, D221 | 0.490 | Higher elastomer | Higher elastomer, higher talc |
| ENR 7380, ethylene 1-butene elastomer | 0.210 | | |
| JetFil 700C, platy talc | 0.300 | | |
| Flexural Modulus | 431,378 | 370,372 | 402,122 |
| Flexural Modulus, 1% secant, psi | 327,354 | 273,439 | 329,850 |
| Heat Distortion Temperature | 134.5 | 122.63 | 133.1 |
| Tensile Strength @ yield, psi | 6969 | 6471 | 6876 |
| Instrumented Dart Impact, 15 mph, −30 C., total energy, ft-lbf | 3.18 | 21.8 | 31.12 |

These formulations were utilized to evaluate the material for injection molding of large structural automotive structures such as valence panels, toppers, and retainers. The evaluations consisted of three major parts: confirmation of the ability of the material to fill the tools in a manner equivalent to PC/ABS and commercially available TPO grades used to injection molding; evaluation of the material's shrinkage characteristics both during molding of the parts and after several weeks at room temperature; and finally injection molding of an instrument panel retainer, followed by use of foam-in-place technology create an instrument panel. The instrument panel can then be tested for performance in comparison to the material choice currently in use.

Version B from Table 13 above was tested for its flow characteristics in large scale injection molding by use of a grained panel tool with an opening 36 inches long, 10 inches wide, and 2.6 mm thick. The tool was center gated, giving a maximum polymer flow length of over 20 inches. There was no problem filling this tool, with a very wide processing window ranging from a low speed injection rate of 0.2 inches per second up to an injection speed of 2 inches per second. The injection molding machine had trouble maintaining hydraulic pressure at this point because it was not designed to deliver higher flow rates at this pressure. The injection rate, the time to transfer, and the peak injection pressure are tabulated in Table 14 below.

TABLE 14

Evaluation of Mold Filling

| Injection Rate, in/sec | 0.2 | 0.4 | 0.6 | 0.8 |
|---|---|---|---|---|
| Fill Time, seconds | 18.3 | 13.4 | 8.72 | 6.94 |
| Peak Pressure | 1087 PSI | 1143 PSI | 1190 PSI | 1267 PSI |

A commercially available PC/ABS which is the incumbent material for rigid applications and a commercially available TPO which is widely utilized for show parts in instrument panel applications were molded on the same equipment utilized to evaluate the injection molding characteristics of the material of the invention. The conditions for the PC/ABS and TPO are summarized below in Table 15.

TABLE 15

Molding Conditions

| | I. PC-ABS | II. Other TPO |
|---|---|---|
| Injection Rate, inches/second | 2.0 | 2.0 |
| Barrel Temperatures | 520, 520, 525, 525, 525, 525, 520, 520 | 420, 420, 425, 425, 425, 425, 420, 420 |
| Shot Size, inches | 5.50 | 5.50 |
| Transfer Point | 1.60 | 1.30 |
| Hold Time | 4.0 sec. | 4.0 sec |
| Hold Pressure, psi | 1000/650/400 | 1100/650/400 |
| Hold Time. Sec | 1.0/2.0/2.0 | 1.0/2.0/2.0 |
| Cooling Time | 30 sec. | 30 sec |
| Mold Temperature | 140 deg. F. | 110 deg. F. |

The parts that had been produced during these molding evaluations were then compared for percentage shrinkage from the tool dimensions. These results are compared in Table 16 below. Because the molding experiment had been done 2 weeks before the molding checks of the PC/ABS and the commercial competitive TPO, the shrinkage data reported for the material of the invention truly represents the final part size. As demonstrated herein, the TPOs of this invention have the capability of matching the finished part dimensions of PC/ABS. However, the crystallinity of this material does result in a thickness change, which is reflected in the lighter weight of the formulation 3 panels.

TABLE 16

Dimensions of Molded Parts

| Material Molded | Length of Part (in) | Width at Center (in) | Width at End (in) | Weight of Part |
|---|---|---|---|---|
| Version B | 35.82 | 9.89 | 9.87 | 1.62 |
| PC/ABS | 35.81 | 9.89 | 9.88 | 1.79 |
| Commercial TPO | 35.73 | 9.85 | 9.83 | 1.65 |

Version A from Table 13 above was evaluated by injection molding a retained in the production tool used to produce the current PC/ABS retainer. The primary change made was to lower the injection temperature. The molding process was summarized as shown in Table 17 below.

It is noted that a significant amount of crystallization of the Version B composition, approximately 90 percent or more, occurs in the tool cavity, prior to the opening of the tool. The "out-of-tool" shrinkage in the x-y direction is 10 percent or less than the amount of shrinkage in the x-y direction inside the tool cavity. The "in-tool" shrinkage in the z-direction is approximately 10 times the shrinkage in the x or y direction. The z direction shrinkage is how a lighter inventive part can be produced from a TPO composition as described herein, even though the part is molded in the same tool, as the PC/ABS, and the density of the TPO is higher.

TABLE 17

Retainer Production on a Husky 20 Injection Molder

Temperature Settings

| | |
|---|---|
| Barrel Temperature, degrees F. | 430 |
| Nozzle Temperature, degrees F. | 430 |
| Runner Temperatures, degrees F. | 445 |
| Sprue Temperatures, degrees F. | 435 |
| Mold Temperature, degrees F. | 120 |

Injection Conditions

| | |
|---|---|
| Shot Size, inches | 6.55 |
| Fill Rate, inches per second | 1.0 |
| Fill Time, seconds | 7.94 |
| Peak Pressure, psi | 1047 |

Packing Conditions

| | |
|---|---|
| Pack Pressure, psi | 400 |
| Pack Time, 4 sec | 4 |
| Cooling Time, seconds | 50 |
| Back Pressure, psi | 100 |

The parts produced fit the production tools for using foam-in-place technology to add a thermoformed TPO skin. The instrument panel was then evaluated by testing as if it were a commercial instrument panel. The results of these evaluations are shown in Table 18 below.

TABLE 18

Performance Evaluation of Formulation 2 as a Retainer

| Performance Test | Performance of Patent TPO | PC/ABS Performance |
|---|---|---|
| Airbag Deployment at −30 C. | No brittle failure | No brittle failure |
| Head Impact, g force | 79.7 | 79.9 |
| Buzz, Rattle and Squeak | Pass without tape | Squeak suppression required |

Although the invention has been described in certain detail through the preceding specific embodiments, this detail is for the primary purpose of illustration. Many variations and modifications can be made by one skilled in the art, without departing from the spirit and scope of the invention, as described in the following claims.

What is claimed is:

1. An automotive part, comprising at least one component formed from a polyolefin composition having a heat deflection temperature (HDT) of greater than about 100° C. and flexural modulus of greater than about 1930 MPa, the composition comprising:
    A) a crystalline isotactic propylene homopolymer having a flex modulus of greater than about 1930 MPa and an HDT of greater than about 100° C.;
    B) an ethylene/α-olefin interpolymer having Tg of less than about −30° C., a tan delta measured at 0.1 radians/s at 190° C. of less than about 2, an HDT that is greater than, or equal to, the peak melting temperature of the ethylene/α-olefin interpolymer, measured by differential scanning calorimetry, and
    C) a platy filler, and
    wherein the weight ratio of homopolymer:interpolymer (A:B) is between about 9:1 and about 6:4, and
    wherein the filler has an HDT efficiency factor greater than, or equal to, about 1.5, and a flexural modulus efficiency factor greater than about 3, and wherein each efficiency factor is determined by measuring the effect of a "20 weight percent addition of filler" on the respective HDT or flexural modulus of a blend of the crystalline isotactic propylene homopolymer and the ethylene/α-olefin interpolymer.

2. The automotive part of claim 1, wherein the propylene homopolymer has a flex modulus of greater than 2070 MPa, and an HDT of greater than 110° C.

3. The automotive part of claim 1, wherein the propylene homopolymer has a flex modulus of greater than 2210 MPa, and an HDT of greater than 120° C.

4. The automotive part of claim 1, wherein the α-olefin of the ethylene/α-olefin interpolymer is a C3-C20 α-olefin.

5. The automotive part of claim 1, wherein the α-olefin of the ethylene/α-olefin interpolymer is selected from the group consisting of propylene, 1-butene, 1-hexene and 1-octene.

6. The automotive part of claim 1, wherein the filler is platy talc.

7. The automotive part of claim 4, wherein the ethylene/α-olefin interpolymer has a Tg of less than 40° C.

8. The automotive part of claim 7, wherein the difference between the HDT and the melting point Tm of the ethylene/α-olefin interpolymer is at least 4.

9. The automotive part of claim 7, wherein the difference between the HDT and the melting point Tm of the ethylene/α-olefin interpolymer is at least 8.

10. The automotive part of claim 7, wherein the tan delta, measured at 190° C. and 0.10 radians/second, of the ethylene/α-olefin interpolymer is 2 or less.

11. The automotive part of claim 7, wherein the tan delta, measured at 190° C. and 0.10 radians/second, of the ethylene/α-olefin interpolymer is 1.8 or less.

12. The automotive part of claim 7, comprising 30 weight percent of talc based on the total weight of the composition.

13. The automotive part of claim 1, wherein the composition further comprising at least one additive selected from the group consisting of a pigment, a scratch and mar resistant additive, and combinations thereof.

14. The automotive part of claim 1, wherein the part is selected from the group consisting of an instrument panel, a door panel, a dashboard, a valence panel, a body side molding, a trim molding, an armrest, a sun visor, a compartment case and an insulating mat.

15. A method of making the automotive pan of claim 1, said method comprising injection molding the composition comprising the polypropylene homopolymer, the ethylene/α-olefin interpolymer and the platy filler.

16. The automotive part of claim 1, wherein the weight percent of filler, based on the "sum weight of the propylene homopolymer, the ethylene/α-olefin interpolymer and filler," is greater than the weight percent of the ethylene/α-olefin interpolymer, based on the "sum weight of the propylene homopolymer and the ethylene/α-olefin interpolymer."

17. The automotive part of claim 1, wherein the composition further comprises one or more other different ethylene/α-olefin interpolymers.

18. The automotive part of claim 17, wherein the weight percent of filler, based on the "sum weight of the propylene homopolymer, the ethylene/α-olefin interpolymer, the one or more other different ethylene/α-olefin interpolymers, and filler," is greater than the weight percent of the ethylene/α-olefin interpolymer and the one or more other different ethylene/α-olefin interpolymers, based on the "sum weight of the propylene homopolymer, the ethylene/α-olefin interpolymer and one or more other different ethylene/α-olefin interpolymers."

19. The automotive part of claim 1, wherein the at least one component is formed by injection molding.

20. The automotive part of claim 19, wherein the injection molding is preformed using tooling designed for PC/ABS resins.

21. The automotive part of claim 1, wherein the part is an instrument panel.

22. The automotive part of claim 1, wherein the part is a door panel.

23. The automotive part of claim 1, wherein the part is formed by injection molding, and wherein "out-of-tool" shrinkage of the pan in the x-y direction is 10 percent or less of the amount of shrinkage of the part in the x-y direction inside the tool cavity.

24. The automotive part of claim 1, wherein polyolefin composition has a heat deflection temperature (HDT) of greater than about 120° C.

25. The automotive part of claim 1, wherein the polyolefin composition further comprises at least one polydimethylsiloxane.

* * * * *